United States Patent
Thomas et al.

(10) Patent No.: US 7,281,579 B2
(45) Date of Patent: Oct. 16, 2007

(54) METHOD FOR TERMINATING OR REDUCING WATER FLOW IN A SUBTERRANEAN FORMATION

(75) Inventors: Forast Brent Thomas, Crossfield (CA); Gregory E. Anderson, Calgary (CA); William J Heaven, Calgary (CA)

(73) Assignee: Aqueolic Canada Ltd., Calgary, Alberta (CA)

( * ) Notice: Subject to any disclaimer, the term of this patent is extended or adjusted under 35 U.S.C. 154(b) by 280 days.

(21) Appl. No.: 10/496,794

(22) PCT Filed: Dec. 9, 2002

(86) PCT No.: PCT/CA02/01880

§ 371 (c)(1),
(2), (4) Date: Apr. 13, 2005

(87) PCT Pub. No.: WO03/048513

PCT Pub. Date: Jun. 12, 2003

(65) Prior Publication Data

US 2005/0178544 A1   Aug. 18, 2005

(51) Int. Cl.
*E21B 43/12* (2006.01)

(52) U.S. Cl. .................... 166/270; 507/220

(58) Field of Classification Search .......... 166/312, 166/270, 252.1, 250.01; 507/252, 220
See application file for complete search history.

(56) References Cited

U.S. PATENT DOCUMENTS

| | | | |
|---|---|---|---|
| 3,724,551 A * | 4/1973 | Troscinski et al. | 166/295 |
| 3,884,861 A | 5/1975 | Whitworth et al. | |
| 4,031,958 A * | 6/1977 | Sandiford et al. | 166/270 |
| 4,485,875 A * | 12/1984 | Falk | 166/295 |
| 4,532,052 A * | 7/1985 | Weaver et al. | 507/222 |
| 4,683,949 A | 8/1987 | Sydansk et al. | |
| 4,737,265 A * | 4/1988 | Merchant et al. | 208/188 |
| 4,744,418 A | 5/1988 | Sydansk | |
| 4,836,285 A * | 6/1989 | Navratil et al. | 166/295 |
| 4,844,168 A | 7/1989 | Sydansk | |
| 5,062,483 A | 11/1991 | Kisman et al. | |
| 5,067,564 A * | 11/1991 | Sydansk | 166/270 |
| 5,338,465 A | 8/1994 | Lockhart et al. | |
| 5,358,043 A | 10/1994 | Moradi-Araghi | |
| 5,418,217 A | 5/1995 | Hutchins et al. | |
| 6,569,983 B1 * | 5/2003 | Treybig et al. | 528/102 |
| 6,695,055 B2 * | 2/2004 | Hirasaki et al. | 166/294 |
| 2005/0016733 A1 * | 1/2005 | Dawson et al. | 166/308.2 |

FOREIGN PATENT DOCUMENTS

| | | |
|---|---|---|
| CA | 1277936 | 12/1990 |
| GB | 2062070 A | 5/1981 |
| WO | WO 9812239 A1 * | 3/1998 |

OTHER PUBLICATIONS

Journal of Petroleum Technology, Entitled "Horizontal Barriers for Controlling Water Coning", by Karp, et al., pp. 783-790, 1962.

* cited by examiner

Primary Examiner—David Bagnell
Assistant Examiner—Daniel P Stephenson
(74) Attorney, Agent, or Firm—Arne I. Fors

(57) ABSTRACT

This invention relates to a method of reducing the deleterious effects of water production in a subterranean formation by placing an aqueous phase polymer and/or resin, which at a designated set up time, solidifies and blocks water conduits. This invention pertains specifically to a method of placing the polymer and displacing the polymer and/or resin to establish post treatment gas and oil permeability.

6 Claims, 3 Drawing Sheets

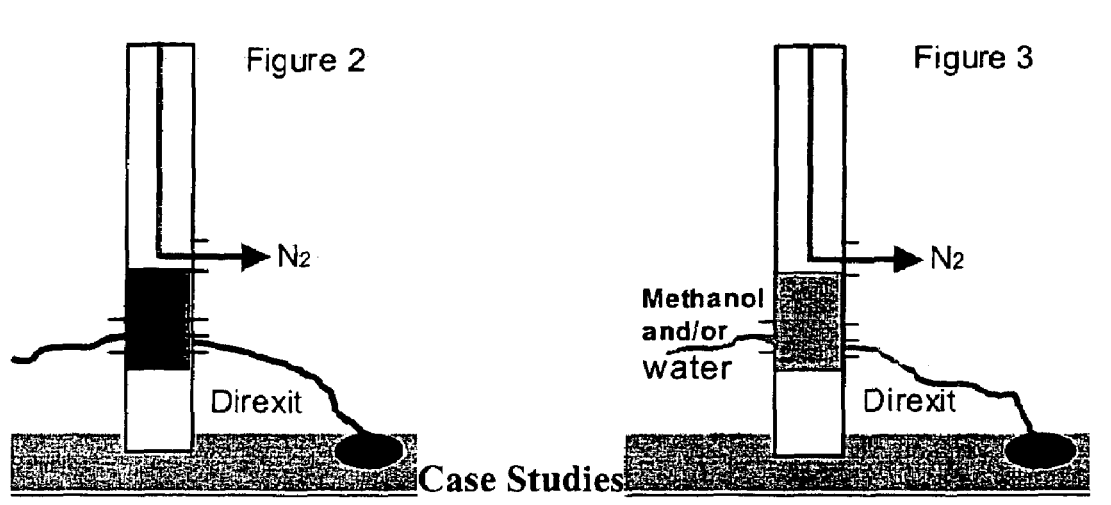
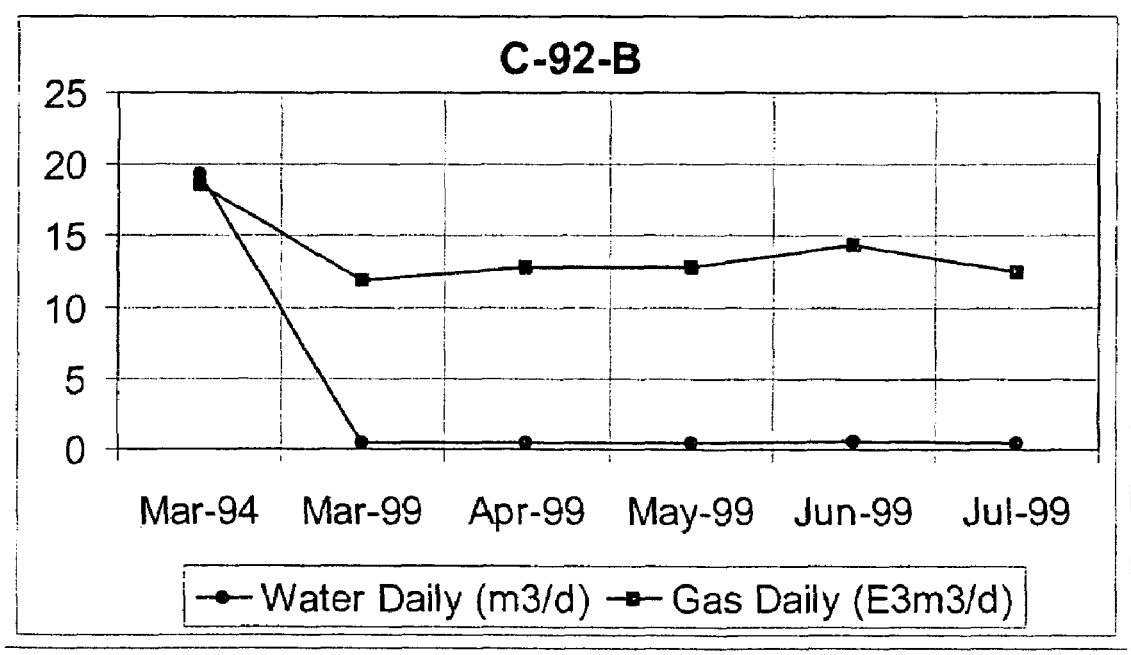

METHOD FOR TERMINATING OR REDUCING WATER FLOW IN A SUBTERRANEAN FORMATION

BACKGROUND OF THE INVENTION (i) Field of the Invention

This invention pertains to a method for shutting off or reducing the unwanted production of water from wells in a gas and oil-bearing formation due to flow through paths of least resistance.

(ii) Description of the Related Art

In the operation of wells used in the recovery of gases and associated liquids from subterranean formations unwanted passage of water can severely disrupt or in fact terminate the desired operation of a well. Frequently, a hydrocarbon reservoir contains water, either due to indigenous water or injected water. Water bypassing is often observed since the mobility of the water is usually high and therefore, when a pressure gradient is imposed, water tends to flow more readily than the hydrocarbon phases. The effects of water production are deleterious, as the water must be separated from saleable hydrocarbon products and disposed of in an environmentally safe manner. This can result in the well being shut in because of the adverse economics of increased separation and disposal costs of water compared to the declining hydrocarbons as water flow increases. In addition, the produced water can kill the gas flow in the well when the hydrostatic pressure of the water column is greater than the reservoir pressure (which prevents gas or oil flow). Artificial lifting costs to handle the water can add substantially to the cost of production.

These problems are not unique and the solutions have traditionally involved apparatus, methods, and compositions adapted to cover, seal or otherwise plug the openings thereby shutting off or reducing the passage of water. A barrier often is considered for unwanted liquid and gas production mitigation. There are a number of articles and patents describing various techniques which have been used to reduce water production due to coning or bottom water flow. Examples of these are Karp. Et al., Horizontal Barrier for Controlling Water Coning, Journal of Petroleum Technology, Vol. XX, pp. 783-790, 1962, Canadian Patent No. 1,277,936 to Costerton et al. and U.S. Pat. No. 5,062,483 issued to Kisman and Russell. These patents and the article discuss specific methods for isolation of bottom water flow. Polymers, such as polyacrylamide and polyphenolic resins, have been used in the past to enter the water conduits in the reservoir, and at a predefined time, setup or solidify to block or substantially impede water flow in the conduits. Since these solutions are aqueous they have a preference for the water conduits because of the low interfacial tension between two aqueous fluids. This can result in the aqueous solutions mixing with the large volumes of water and becoming unduly diluted.

These treatments have been successfully used for plugging high water flow regions but, due to their density, many times these treatments are gravimetrically unstable and are therefore less effective for bottom water control. Some of these previous applications are described in U.S. Pat. No. 4,683,949; U.S. Pat. No. 5,358,043; U.S. Pat. No. 5,418,217; U.S. Pat. No. 4,744,418; U.S. Pat. No. 5,338,465; U.S. Pat. No. 4,844,168 and U.S. Pat. No. 3,884,861.

Another technique disclosed in U.K. Patent GB 2,062,070A proposed a viscosified polymer which would be emulsified in oil and injected into a gas-producing formation to control bottom water production. This, however, was not successful due to the fact that the inherently high viscosity precluded the polymer from entering into many of the zones in which the water was flowing. Also, polymer gel emulsified in oil and stabilized with surfactants often suffer from phase separation in porous media.

SUMMARY OF THE INVENTION

It is a principal object of the present invention to provide a means whereby a water-blocking agent can be placed on top of or near the top of the oil-water or gas-water contact in a reservoir where the hydrocarbon phase (oil and/or gas) is underlain by a bottom water zone.

It is another object of the invention to provide a means whereby a water-blocking agent can be placed in the conduits (fractures, wormholes, high permeability streaks, near well-bore deficiencies, etc.) to prevent water to migrate to the well-bore from aquifers above, below and from the edge of the production zone.

It is a further object of this invention to provide ease of injection into production or injection wells and therefore must be as a liquid phase. A further object of the invention is the provision of chemicals for low viscosity of the chemical during placement and, upon appropriate placement and setup time, high viscosity to reduce water flow, particularly to block water flow vertically or through thief zones.

The invention has advantages whereby, in using available water and crude oil or any designated liquid hydrocarbon phase of a specific density, the overall density of the chemical treatment can be adjusted so that the treatment floats on water and has a modified or unmodified viscosity as well. Another advantage of the invention is that by increasing the delta pressure to inject the polymer, capillary forces in both the oil- and water-bearing portions of the rock are overcome so that the block can be total. More particularly, this invention relates to a method of placing aqueous polymers and/or resins into the water conduits of the hydrocarbon reservoir. When these set up or solidify, the unwanted water production is shut off or reduced.

The challenge is to place these treatments without adversely effecting the relative permeability of the reservoir for gas or oil production and without invading the hydrocarbon zones. This can be accomplished in one embodiment of the invention for gas wells with or without oil by the utilization of water and a gas such as nitrogen gas injected before the polymer is injected downhole and a liquid solvent such as methanol and/or water and a gas such as nitrogen gas after the polymer is injected downhole. By following the protocol as will be described, not only is water production reduced or shut off but also any risk associated with blocking off or restricting the flow of gas or oil is minimized. This can be accomplished in another embodiment of the invention by placing an emulsion (with a density intermediate the oil phase and water phase so it floats) between the oil production zone and the underlying aquifer. This will stop or reduce the water from coning up from below. These embodiments will optimize the post treatment production by ensuring the gas and oil permeability is maintained and potentially improved.

An effective aqueous solution of a polymer such as phenolformaldehyde sold under the trade-mark DIREXIT™ having low initial viscosity with gelation over a predetermined time interval can be injected into the formation as an aqueous polymer gel or as a polymer gel-in-oil emulsion which is lighter than water.

Another polymer gel having a relatively low initial viscosity with gelation over a predetermined period of time is polyacrylamide sold under the trade-mark ALOFLOOD 2545®, which can be injected into the formation as an aqueous polymer gel or as a polymer gel-in-oil emulsion lighter than water.

A preferred polymer gel-in-oil emulsion comprises a polymer formed from a 1,2-substituted ethene compound such as a substituted styrylpyridinium compound sold under the trade-mark HYDRAGEL™ and described in published U.K. Patent Application Serial No. 96 194 19.6, preferably injected into the formation as an aqueous oil-in-gel emulsion.

In its broad aspect, the method of the invention for placing an aqueous polymer in the water conduits of the production zone of a gas or oil reservoir to form a barrier to shut off or reduce unwanted production of water, through a well-bore tubing in communication with the production zone of the gas or oil reservoir, comprises injecting water into the production zone to establish an injection rate into the production zone, and injecting the aqueous polymer into the production zone at said injection rate, said aqueous polymer selected from the group consisting of phenolformaldehyde, polyacrylamide and 1,2-substituted ethane. The aqueous polymer can also be injected as an aqueous oil-in-polymer emulsion. The aqueous polymer can be a substituted styrylpyridinium compound in a concentration of at least about 0.5 wt % in an aqueous solvent and may be emulsified with up to 50 wt % oil.

In accordance with another aspect of the invention, the method for placing an aqueous polymer gel in the water conduits of the production zone of a gas or oil reservoir to form a barrier to shut off or reduce unwanted production of water, through a well-bore tubing in communication with the production zone of the gas or oil reservoir, comprises injecting water into the production zone to establish an injection rate into the production zone, injecting $N_2$ or $CO_2$ gas into the formation in a first gas injection in an amount sufficient to displace the water or flushing the water to surface with $N_2$ or $CO_2$ in an amount sufficient to displace the water, injecting the aqueous polymer gel into the production zone at said injection rate, injecting a solvent selected from methanol, water or methanol and water, for reducing interfacial tension, and flushing the solvent from the well-bore tubing and communicating the well-bore with the production zone with $N_2$ or $CO_2$ gas in a second gas injection to optimize gas permeability in the production zone. The method preferably comprises ascertaining the $N_2$ or $CO_2$ first gas injection rate while injecting gas into the formation to displace the water, monitoring the $N_2$ or $CO_2$ second gas injection rate, comparing the $N_2$ or $CO_2$ gas first injection rate with the $N_2$ or $CO_2$ second injection rate, and increasing the $N_2$ or $CO_2$ gas second injection rate to match the $N_2$ or $CO_2$ first injection rate to re-establish and optimize the gas permeability in the production zone.

The aqueous polymer gel preferably is at least one of phenolformaldehyde, polyacrylamide or a 1,2-substituted ethane, more preferably a substituted stryrylpyridinium compound. The aqueous polymer gel can be emulsified with up to 50 wt % oil and stabilized with a surfactant.

In accordance with another embodiment, by incorporating at least a two-stage sequential treatment, larger conduits of water flow may be blocked upon injection of a fist horizontal stage whereas a second stage will serve to impede undesirable fluid flow (water or gas) from the secondary flow conduits. Moreover the second stage of the treatment has a lower vertical limit provided by a generally horizontal barrier down through which the second stage will not pass. This would have specific application to treatments where the second stage has a specific gravity higher than 1.0 but this layered approach would also be very effective for systems where the second or subsequent stages are less or more dense than water.

The invention describes a composition of the emulsion which is gravimetrically stable with respect to the oil-water or gas-water contact and will form a first stage of a water impermeable solid or gel phase, preferably followed by a second stage which will be largely independent of specific gravity considerations and which will complement the first stage. By designing the viscosity and density of the treatment, vertical flow of undesirable phases can be reduced and flow from thief zones can also be targeted.

BRIEF DESCRIPTION OF THE DRAWINGS

The method of the invention will be described with reference to the accompanying drawing, in which:

FIG. 2 is a schematic illustration of a well bore in which the polyphenolic resin is displaced by $N_2$;

FIG. 3 is a schematic illustration of a well bore in which the polyphenolic resin is displaced by methanol;

FIG. 4 is a graph, of Case 1, showing daily gas and water production after application of the method of the invention.

DESCRIPTION OF THE PREFERRED EMBODIMENT

The requirement of this present invention, pertaining to shutting off or reducing water production where water is coning up to the production perforations, through partially consolidated or unconsolidated sands is that the density of the emulsion phase must be greater than that of the hydrocarbon, i.e. oil or liquified gas, and less than that of the formation water. By injecting this intermediate-density emulsion phase into the reservoir, it will necessarily settle due to gravity to the point where it sits on top of the water. By appropriate design of the properties of the emulsion (density and viscosity) the treatment can also be specifically placed in high permeability layers or zones. Once in place, the setup time mechanism must be such that it gels or becomes a solid phase and thereby offers significant resistance to unwanted gas or water (or any other undesirable phase) production in the region of the near well-bore or where the coning response exists. The emulsion phase must have the properties that it has adequate setup time, adequate rigidity to withstand differential pressure and the viscosity is such that it will flow easily into various types of rock. The treatment is possible to be placed both from the current production perforations as well as perforations which may be newly created.

The aqueous component of the invention would include a polymer which has been designed at a specific concentration for setup time which is consistent with the physical situation. The composition of the aqueous polymer phase of the emulsion can be those of a polyacrylamide and cross-linking nature such as disclosed in U.S. Pat. No. 4,693,949, U.S. Pat. No. 5,358,043 or U.S. Pat. No. 5,418,217 and the compositions of the phenol formaldehyde as exemplified in the U.S. Pat. No. 3,884,861 and U.S. Pat. No. 4,091,868 or Canadian Patent No. 1,187,404. The oil component can be a refined oil including diesel, mineral oil, benzene, kerosene or the like. Crude oils can also be used but preferably refined oil products with lower densities should be used from a density perspective. A small amount of surfactant usually is required to stabilize emulsions.

Figure 1:
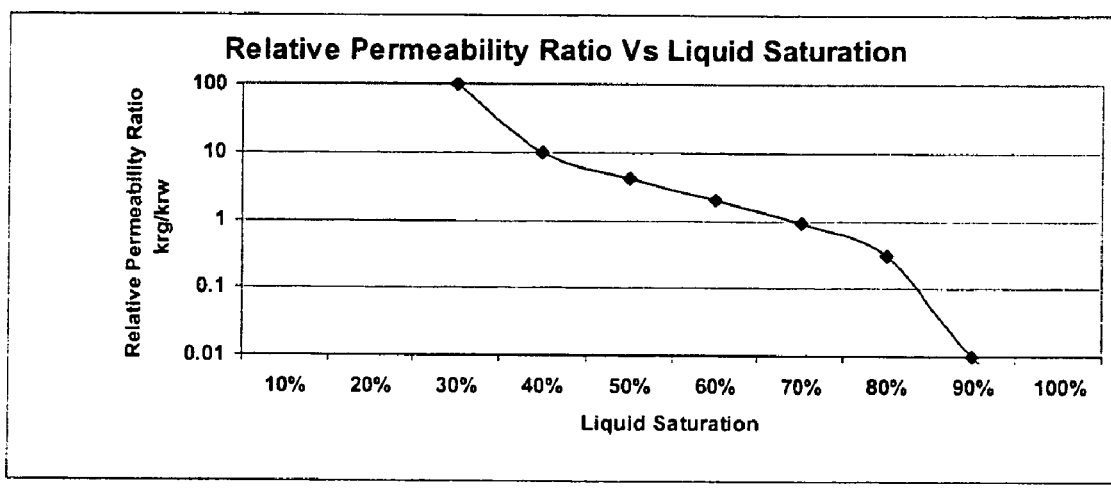
FIG. 1 is a graph illustrating relative permeability to liquid saturation in a gas-bearing reservoir.

There are many challenges to overcome in properly placing an aqueous solution in a reservoir to shut off or reduce water migration to the production perforations in a producing well, such as a producing gas well with or without oil production. Before proceeding with an application of the aqueous solution, an injection rate for reservoir compatible water should be established to ascertain whether the polymer or resin could be safely injected into the subterranean formation under pressure and time limitations. The well may have to be stimulated in order to increase the injection rate. The problem with this injection test is that the water saturation in the near well bore region can increase and, as a consequence, reduce the relative permeability of gas. As a result the gas flow is reduced, or in fact, shut off. FIG. 1 illustrates how the increase in water saturation effects the relative permeability of gas. To overcome this problem, gas ($N_2$ or $CO_2$) should be injected into formation, after the injection test with water is complete, to displace the water and to re-establish the gas saturation and the conduits to the gas zone.

Another possible problem is that the water used in the injection test can charge up the reservoir, i.e. fill the large voids so more pressure is required to inject the subsequent polymer and/or resin into the reservoir. The increase in pressure can force the polymer into the gas zone if the increase in differential pressure ($\Delta P$) overcomes the capillary pressure keeping the aqueous solution out of the gas zone. To overcome this problem, the water used for the injection test can be flushed to surface using gas ($N_2$ or $CO_2$). The gas is injected down the tubing and the water is flushed back through the annulus, or vice-versa. If a permanent packer to isolate the tubing from the casing is in place, coil tubing will be required to perform this task. If coil tubing is not an option, after the feed rate with water is performed the water in the well bore should be displaced into formation with gas and the application with the polymer delayed for 24 hours to allow the pressure in the reservoir to reach equilibrium. Once the water is displaced, a feed rate for gas should then be established.

A gas such as nitrogen gas ($N_2$), carbon dioxide ($CO_2$), and the like gases is then injected. The volume of gas, e.g. $N_2$, will be calculated to flush all the fluids out of the tubing and/or annulus and to establish gas saturation in the near well bore matrix. With the gas saturation assured, the subsequent aqueous treatment will then benefit from capillary pressure selectivity in addition to permeability contrasts to drive the aqueous phase treatment into the region where the water is flowing. Once the treatment is injected, a solvent such as methanol is injected and then a gas such as $N_2$ injected. The liquid solvent will reduce interfacial tension (IFT) for the subsequent gas inflow to the well-bore and will permit less draw down pressure being required for the subsequent production of gas. The solvent will help ensure that the aqueous solution is cleared from the perforations. If the aqueous solution is displaced with only a gas, then once the tubing and/or annulus volume have been displaced, the gas may only invade the gas zone through the very top of the perforations. This would occur because there is no capillary pressure between two gases and gases are very compressible. (refer: FIG. 2) This would result in the lower perforations being blocked off. Because methanol is a less compressible fluid than a gas such as $N_2$, it will continue to displace the aqueous solution to enable the perforations to be cleared. (refer: FIG. 3). The gas such as $N_2$ will ensure gas permeability is maintained to optimize post treatment gas production.

A description of exemplary field tests of embodiments of the method of the invention are as follows.

Step by Step Field Test Summary for Shutting Off or Reducing Water in a Gas Well with or Without Oil 1. Connect the aqueous polymer mixing and pumping unit along with the gas (e.g. $N_2$ or $CO_2$) pumping unit to well head.
2. Ascertain the injection rate ($m^3$/minute) for an aqueous polymer solution such as phenolformaldehyde by first injecting reservoir compatible water into the formation to ensure there is adequate time (including a margin of safety) to inject the designed volume of polymer before it sets up. The reservoir may need to be stimulated to achieve the fluid injection rate.
3. The water used in the injection test in Step 2 can be flushed back to surface or forced into the reservoir using gas (e.g. $N_2$ or $CO_2$).
4. Ascertain the injection rate ($m^3$/minute) of gas (e.g. $N_2$ or $CO_2$) at Standard Temperature and Pressure (S.T.P.) to ensure all liquids are cleared from well-bore and to establish gas conduits into the reservoir formation. This rate can be compared to the injection rate of the gas after the polymer has been displaced to help determine if gas permeability has been reduced.
5. Mix the programmed volume and concentration of aqueous polymer.
6. Follow the gas from Step 4 with the programmed volume of water (optional) to ensure the aqueous polymer does not plug off the gas permeability. In many cases the injection pressure increases when the aqueous fluid first enters the formation and this can force the liquid into the gas zone until the conduits to the aquifer are established. It is much preferred this liquid is water rather than the polymer which once set will reduced the post treatment permeability to gas.
7. Follow the water (optional) with injection of the mixed aqueous polymer solution, ensuring that the rates are as low as possible and are still able to safely place/displace solution into the formation before it sets. (Ensure surface pumping pressure added to the hydrostatic pressure does not exceed the fracture pressure of the reservoir).
8. Follow the aqueous polymer (optional) with the programmed volume of solution such as methanol and/or water to ensure the perforations are clear of the displaced aqueous polymer to access the hydrocarbon zone of the reservoir.
9. Follow Step 8, with the programmed volume of gas to not only ensure the aqueous polymer is displaced from the well-bore but also conform communication is established to the gas zone. (This can be monitored by surface pressure since the downhole pressure and temperature are known). This gas can be continuously injected until the polymer has set to ensure gas permeability is maintained.
10. If the initial post treatment injection rate for gas has been reduced significantly by comparison with the rate achieved in Step 4, the injection rate of the gas (e.g. $N_2$ or $CO_2$) can be increased to help re-establish the gas permeability and/or an acid treatment can be performed in the hydrocarbon zone.
11. Shut in the well for 12 hours or until it can be assured that the aqueous polymer is set.

Step by Step Field Test Summary for Shutting Off or Reducing Water Coning in an Oil Well 1(a) If displacing the polymer through existing perforations, set a packer (retainer) above the production perforations and ascertain an injection rate (m³/minute) with water through these perforations into the formation to ensure there is adequate time (including a margin of safety) to inject the designed volume of polymer before it sets up. The reservoir may need to be stimulated to achieve the desired rate.

1(b) If displacing the polymer at, or just above the oil water contact, then perforate this interval; set a packer (retainer) above these perforations and ascertain the injection rate (m³/minute) with reservoir compatible water through these perforations into the formation to ensure there is adequate time (including a margin of safety) to inject the designed volume of polymer before it sets up. The reservoir may need to be stimulated to achieve the desired rate. If the well has been completed and there are perforations above the packer (retainer) in the oil production zone then trickle oil into these production perforations through the annulus to ensure the fluids injected through the bottom perforations do not migrate upwardly above the water/oil interface.

2. Connect the aqueous polymer mixing and pumping unit along with the oil pumping unit if require (Step 1(b) above) to the well head.

3. Mix the programmed volume and concentration of an aqueous polymer of the invention.

4. Place the polymer to the bottom of the tubing, 1(a) activate the retainer and shut in the annulus, then displace the aqueous polymer into the reservoir formation, ensuring the surface pressure added to the hydrostatic pressure of the column of fluids does not exceed the reservoir rock fracture pressure. Under displace the polymer, deactivate the retainer and backwash the under displaced polymer to surface. 1(b) fill the well with crude oil, then place the polymer to the bottom of the well-bore tubing, activate the packer (retainer) and displace the aqueous polymer into the formation while keeping positive pressure on the annulus so as to trickle oil through the production perforations. Under displace the aqueous polymer, deactivate the retainer and backwash the aqueous polymer to surface.

5. Shut in the well for along enough period to ensure the polymer has set (usually 12 hours).

The method of the invention will now be described with reference to the following non-limitative examples, in which the aqueous polymer is phenolformaldehyde (DIREXIT™).

| Case 1: Water Shut Off - Gas (FIG. 4) | |
|---|---|
| Volume of Treatment: | 9.66 m³ (60.75 bbl) |
| Formation Type: | Sandstone |
| Work-over Report: | Injected 9.66 m³ DIREXIT ™ at 600 1/min at 1000 kPa using N₂ to ensure gas conduits remained open. The purpose of this treatment was to shut off water coming from the aquifer through hydraulically induced fractures. Before this treatment, there had been only tested production because of the high volumes of water. |
| Result: | Before the treatment, the entire life of the well was in suspend mode with initial tests of 530 mscf/day gas and 190 bbl/day water. After the treatment the well has averaged 460 mscf/day gas and 3 bbl/day water and is an economic success. |

Figure 5:
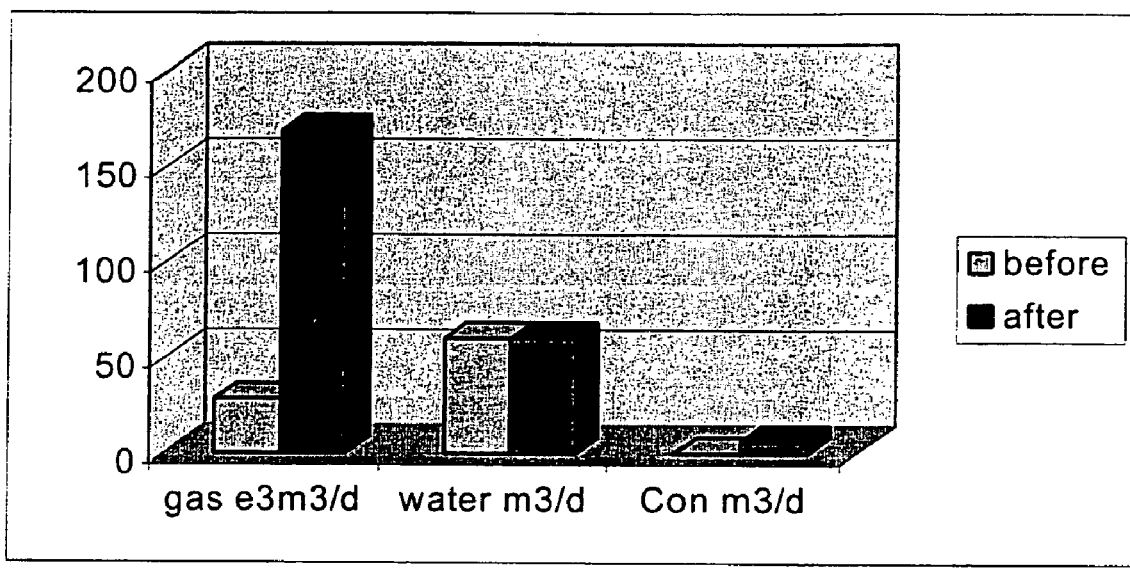
FIG. 5 is a graph, of Case 2, showing daily water, gas, and condensate production after application of the method of the invention.

| Case 2: Water Shut Off - Gas (FIG. 5) | |
|---|---|
| Volume of Treatment: | 12 m³ (75.5 bbl) |
| Formation Type: | Carbonate |
| Work-over Report: | 12 m³ was injected at 300 1/min at 2000 kPa. Purpose of treatment was to stop water flow from bottom water through natural fractures. |
| Result: | Results of this treatment are excellent - gas has increased from 1 mmscf/day with artificial lift to 1.7 mmscf/day with no artificial lift. After treatment, condensate increased from 1.5 m³/day to 6.5 m³/day. Workover pay-out was 3 weeks. |

Although the foregoing description has proceeded with respect to the use of the aqueous polymer DIREXT™, it will be understood that a polymeric material may be used comprising a polymeric material which is at least partially formed from a 1,2-substituted ethene compound, for example a susbtituted styrylpyridinium compound, as disclosed in aforementioned U.K. Patent Application Serial No. 96 194 19.6 and published Canadian Patent Application Serial No. 2,266,578. A first embodiment of a first polymeric compound comprises a compound of general formula

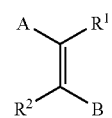

I or a salt thereof where A and B are the same or different and at least one comprises a polar atom or group and $R^1$ and $R^2$ independently comprise non-polar atoms or groups, in a solvent of a type in which ethene itself is generally insoluble and causing the groups C—C in said compound to react with one another to form a polymeric structure.

Preferably, $R^1$ and $R^2$ are independently selected from a hydrogen atom or an optionally substituted, preferably unsubstituted, alkyl group. Preferably, $R^1$ and $R^2$ represent the same atom or group. Preferably, $R^1$ or $R^2$ represent a hydrogen atom.

Preferably, said solvent is a polar solvent. Preferably said solvent is an aqueous solvent. More preferably, said solvent consists essentially of water.

Preferably, said compound of general formula I is provided in said solvent at a concentration at which molecules of said compound aggregate. Aggregation of said compound of general formula I may be shown or inferred from the results of various analyses as hereinafter described and any one or more of such analyses may be used. Preferably, said compound of general formula I is provided in said solvent at or above a concentration suggested by relevant vapour pressure measurements as being a point of aggregation of the compound.

It is believed that said molecules of compound I form aggregates or micelles in the solvent, with the C—C bonds aligned with one another so that the molecules effectively align substantially parallel to one another.

Preferably, the molecules align with groups A and B adjacent to one another.

Said compounds of general formula I may be provided in said aqueous solvent at a concentration of at least 0.5 wt %, preferably at least 1.0 wt % up to 50 wt % and, more preferably, about 1 to 30 wt %.

A second embodiment of a first polymeric compound comprises a compound of general formula II

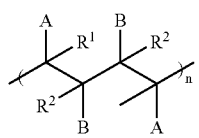

II wherein A, B, $R^1$ and $R^2$ are as described above and n in an integer.

A first or second embodiment of a first polymeric compound of general formula I or II in a solvent can be infinitely mixed with a second polymeric compound which contains one or more functional groups capable of reacting with said first polymeric compound, preferably in an acid catalysed reaction. Said reaction is preferably a condensation reaction. Preferably, said second polymeric compound includes a functional group selected from an alcohol, carboxylic acid, carboxylic acid derivative, for example, an ester, and an amine group. Preferred second polymeric compounds include optionally substituted, preferably unsubstituted, polyvinylalcohol, polyvinylacetate, polyalkylene glycols, for example poolypropylene glycol, and collagen (and any component thereof).

The ratio of the wt % of said first polymeric compound to the wt % of said second polymeric compound (or the sum of the wt % of the second compound and any further compounds) in the mixture is found to influence significantly the properties of the formulation prepared. The ratio of the wt % of said first polymeric compound to that of said second polymeric compound may be in the range 0.01 to 100, is preferably in the range of 0.05 to 50 and more preferably in the range 0.3 to 20.

A gel particularly suited for use in the method of the present invention comprises mixing the resulting mixture from the combination of the first polymeric compound and the second polymeric compound with up to 50 wt % of a hydrocarbon such as oil.

In order to create a stable emulsion, a 0.1 to 2 wt % surfactant has been used. Surfactants such as Tiorco VS (brand name) worked well as did many other kinds of surfactants. In some cases, the surfactant may not be required for emulsification but may depend on the reactivity of the oil and the water used or even the polymer or resin used in the aqueous phase of the solution. Mixing may be performed in many ways including such methods as blenders, propellers or jet mixers. The concentration of the polymer or resin in the aqueous phase can be varied over abroad range including below 1 wt % up to an excess of 20 or 30 wt % and up to 50 wt %.

The present invention provides a number of important advantages. By using available water and crude oil or any designated liquid hydrocarbon phase of a specific density, the overall density of the chemical treatment can be adjusted so that the polymer solution floats on water and has a modified or unmodified viscosity. Once set or gelled, water flow from coning up into the production perforations of the well is effectively blocked. Also, by increasing the differential pressure to inject the polymer, capillary forces in the oil, gas and water-bearing portions of the rock are overcome so that the block can be total.

It will be understood, of course, that modifications can be made in the embodiment of the invention illustrated and described herein without departing from the scope and purview of the invention as defined by the appended claims.

We claim:

1. A method for placing an aqueous polymer in the water conduits of the production zone of a gas or oil reservoir to form a barrier to shut off or reduce unwanted production of water, through a well-bore tubing in communication with the production zone of the gas or oil reservoir, comprising:

injecting water into the production zone to establish an injection rate into the production zone, injecting $N_2$ or $CO_2$ gas into the formation in a first gas injection in an amount sufficient to displace the water or flushing the water to surface with $N_2$ or $CO_2$ in an amount sufficient to displace the water, injecting the aqueous polymer into the production zone at said injection rate, injecting a solvent selected from methanol, water or methanol and water, for reducing interfacial tension, and flushing the solvent from the well-bore tubing and communicating the well-bore with the production zone with $N_2$ or $CO_2$ gas in a second gas injection to optimize gas permeability in the production zone.

2. A method as claimed in claim 1, additionally ascertaining the $N_2$ or $CO_2$ first gas injection rate while injecting gas into the formation to displace the water, monitoring the $N_2$ or $CO_2$ second gas injection rate, comparing the $N_2$ or $CO_2$ gas first injection rate with the $N_2$ or $CO_2$ second injection rate, and increasing the $N_2$ or $CO_2$ gas second injection rate to match the $N_2$ or $CO_2$ first injection rate to re-establish and optimize the gas permeability in the production zone.

3. A method as claimed in claim 1, in which said aqueous polymer is selected from the group consisting of phenol-formaldehyde, polyacrylamide and 1,2-substituted ethane.

4. A method as claimed in claim 3, in which the aqueous polymer is injected as aqueous oil-in-polymer emulsion.

5. A method as claimed in claim 3, in which the aqueous polymer is a substituted styrylpyridinum compound in a concentration of at least about 0.5 wt % in an aqueous solvent.

6. A method as claimed in claim 3, in which the aqueous polymer is emulsified with up to 50 wt % oil.

* * * * *